UNITED STATES PATENT OFFICE.

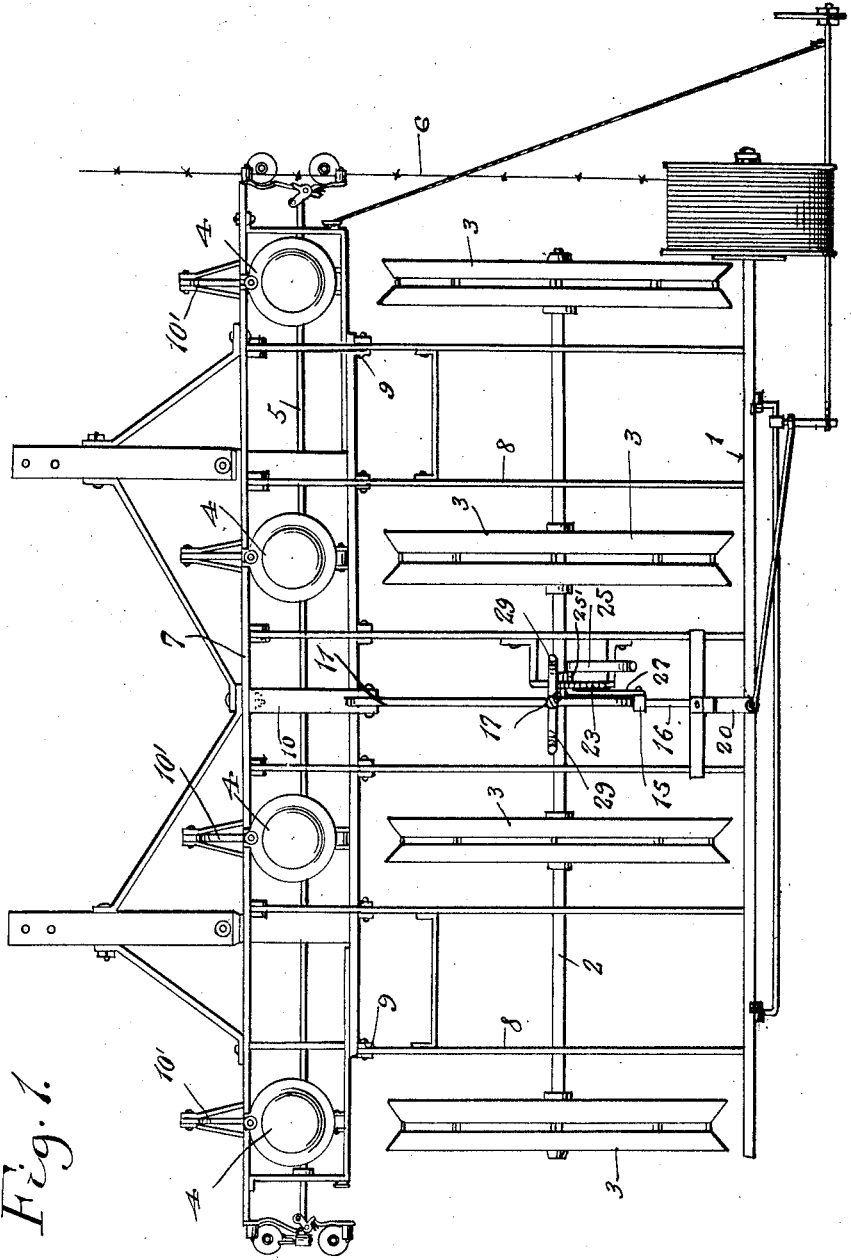

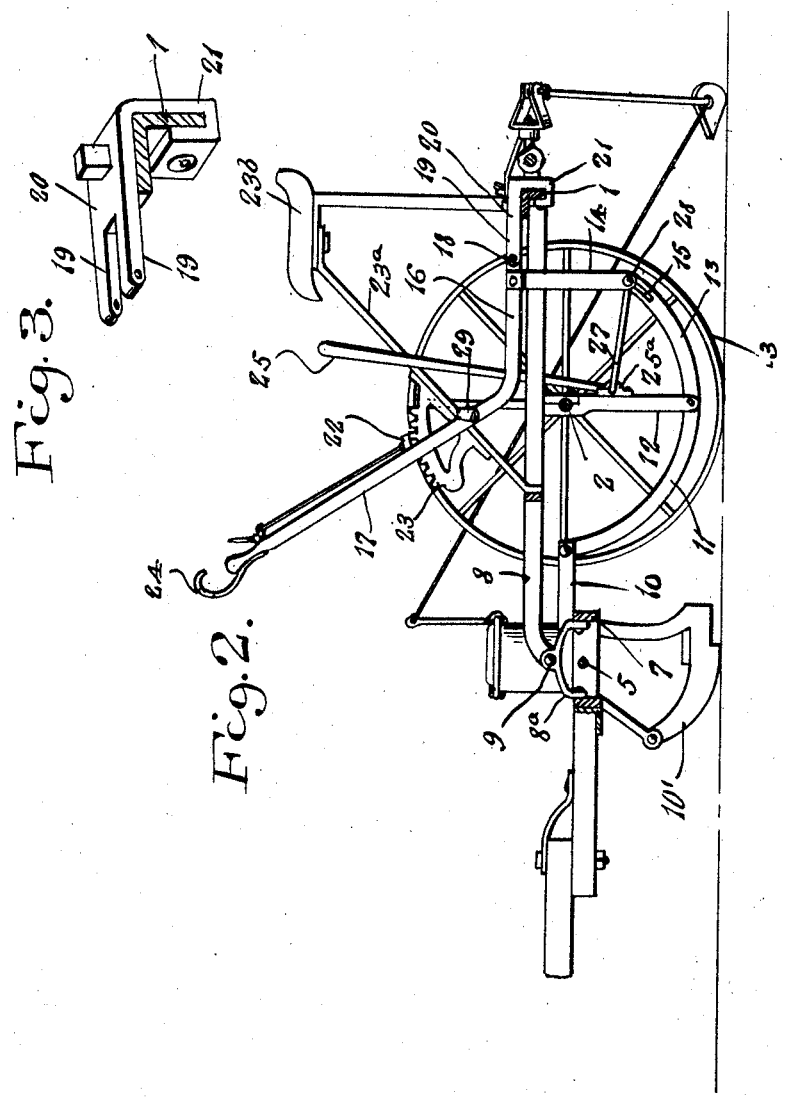

A C KNAPP, OF VICTORIA, ILLINOIS.

CORN-PLANTER.

1,326,872.            Specification of Letters Patent.   Patented Dec. 30, 1919.

Application filed October 26, 1917. Serial No. 198,661.

*To all whom it may concern:*

Be it known that I, A C KNAPP, a citizen of the United States, residing at Victoria, in the county of Knox and State of Illinois, have invented certain new and useful Improvements in Corn-Planters; and I do hereby declare the following to be a full, clear, and exact description of the invention, such as will enable others skilled in the art to which it appertains to make and use the same.

This invention relates to corn planters, and the primary object of this invention is to provide a four row corn planter of the check row type, employing a knotted wire for operating the seed dispensing mechanism.

Another object of this invention is to provide a mechanism for raising the seed dispensing mechanism and the frame which carries the same out of the ground, which structure includes a substantially U-shaped member that is connected to the seed dispensing mechanism carrying frame and to the axle of the planter by suitable braces and also to provide a hand lever which is pivotally carried by the supporting frame of the planter proper and is connected to the rear upper end of the substantially U-shaped bar, and a second lever which is also connected to the rear upper end of the U-shaped bar, so that when a forward push is administered to the first named lever and a rearward pull to the second named lever, the U-shaped member will be rocked for raising the seed dispensing mechanism carrying frame.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which—

Figure 1 is a top plan view of the four row corn planter.

Fig. 2 is a longitudinal section through the planter.

Fig. 3 is a detail perspective view of a part of the planter structure.

Referring more particularly to the drawings, 1 designates the supporting frame of the planter as an entirety which frame carries an axle 2 upon which is mounted a plurality, namely four, supporting wheels 3. The supporting wheels 3 are spaced in the usual manner, of corn planters, directly in the rear of each set of the seed dispensing mechanism, all of which are operated by the seed dispensing shaft or rod 5, through the medium of a knotted wire 6 in the ordinary manner.

The supporting frame 1 of the planter has the frame 7 which supports the seed dispensing mechanism pivotally connected thereto through the medium of bars 8 and arches 8ª as shown at 9.

The frame 7 has a forked bar 10 connected to the front side of the same at its center to which forked bar is connected a substantially U-shaped bar 11. The U-shaped bar is pivotally connected to the forked end of the bar 10 and it extends beneath the axle 2 of the planter, being connected to the axle by a bar 12 as clearly shown in Fig. 2 of the drawings. The upper rear end 13 of the substantially U-shaped bar 11 is connected to a bar 14 by a slot and pin connection as shown at 15. The bar 14 has its upper end connected to the horizontal portion 16 of a pivotally mounted hand lever 17 forwardly of the pivot of the lever. The hand lever 17 is pivotally connected as shown at 18 to the spaced arms 19, which are formed upon a forked plate 20. The forked plate 20 has its rear end bent as shown at 21 to extend about a portion of the frame 1 of the planter, to which it is attached.

The horizontal portion 16 of the hand lever extends forwardly from the arms 19, to a point substantially directly above the axle 2 from where it extends upwardly, as clearly shown in Fig. 2 of the drawings. A dog mechanism 22 is carried by the lever 17, and coacts with a quadrant 23 which is carried by the supporting standard 23ª of the seat 23ᵇ of the planter. A rein holder 24 is also carried by the upper end of the lever 17.

The bar 12 has a bearing 25ª attached thereto which rockably supports a hand lever 25. The hand lever 25 is bent to form the portion 26 which is rockably mounted in the bearing 25ª, and also to form a rearwardly extending arm 27 which is pivotally connected as shown at 28, to the rear upper end of the substantially U-shaped bar 11. When the hand lever 17 is pushed forwardly, it will push downwardly upon the rear upper end of the U-shaped member 11 and consequently push upwardly on the forward end of the same for raising the frame 7 for lifting the planting shoes 10' out of engagement with the ground and when the lever 25 is pulled rearwardly it will also push downwardly upon the rear upper end of bar 13 and assist in raising the frame 10. Thus by using both hands, one upon the lever 17 and the other upon the lever 25 and by using the operator's feet, in connection with the lever 17 and the foot pedals 29 which are carried thereby, the operator can exert all of his strength for raising the frame 7 and the shoes 10' carried thereby.

From the foregoing description taken in connection with the accompanying drawings the advantages of construction and the method of operation of the improved corn planter will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a corn planter including a supporting frame and a seat carried thereby, a seed dispensing mechanism carrying frame carried by said supporting frame and capable of relative vertical movement into and out of operative position, a foot lever positioned in front of said seat so as to be readily accessible for operation by the operator's feet, and a hand lever positioned adjacent the seat, both of said levers being connected to said seed dispensing mechanism carrying frame for raising the same when said foot lever is depressed and the hand lever is simultaneously rocked oppositely thereto.

2. In a corn planter structure including a supporting frame and a seat carried thereby, a seed dispensing mechanism carrying frame carried by said supporting frame and capable of relative vertical movement into and out of operative position, a foot lever positioned adjacent said seat so as to be readily accessible for operation by the operator's feet, a hand lever positioned adjacent the seat so as to be readily grasped by the operator and rocked oppositely to said foot lever, and means for connecting said levers to the seed dispensing mechanism carrying frame for raising said frame when the foot lever is rocked downwardly and forwardly and the hand lever is rocked rearwardly of the supporting frame.

3. In a corn planter structure, the combination, of a supporting frame, a seed dispensing mechanism carrying frame pivotally connected to said supporting frame, a substantially U-shaped member connected to said seed dispensing mechanism carrying frame, a hand lever pivotally connected to said first named supporting frame, a bar connected to said hand lever and to one end of said U-shaped bar for rocking the U-shaped bar upon pivotal movement of the lever, a second hand lever having an angled arm formed upon one end of the same, said angled arm being pivotally connected to said U-shaped member, said second named hand lever being disposed for rocking the U-shaped bar in connection with the first named hand lever when the second named hand lever is moved in direction oppositely to the direction of movement of the first named hand lever.

In testimony whereof I affix my signature in presence of two witnesses.

A C KNAPP.

Witnesses:
C. V. NELSON,
CLARK L. NELSON.